June 18, 1929.  A. F. GILLET  1,717,921
EXTENSIBLE FRAME FOR AUTOMOBILE AWNINGS
Filed Feb. 13, 1928
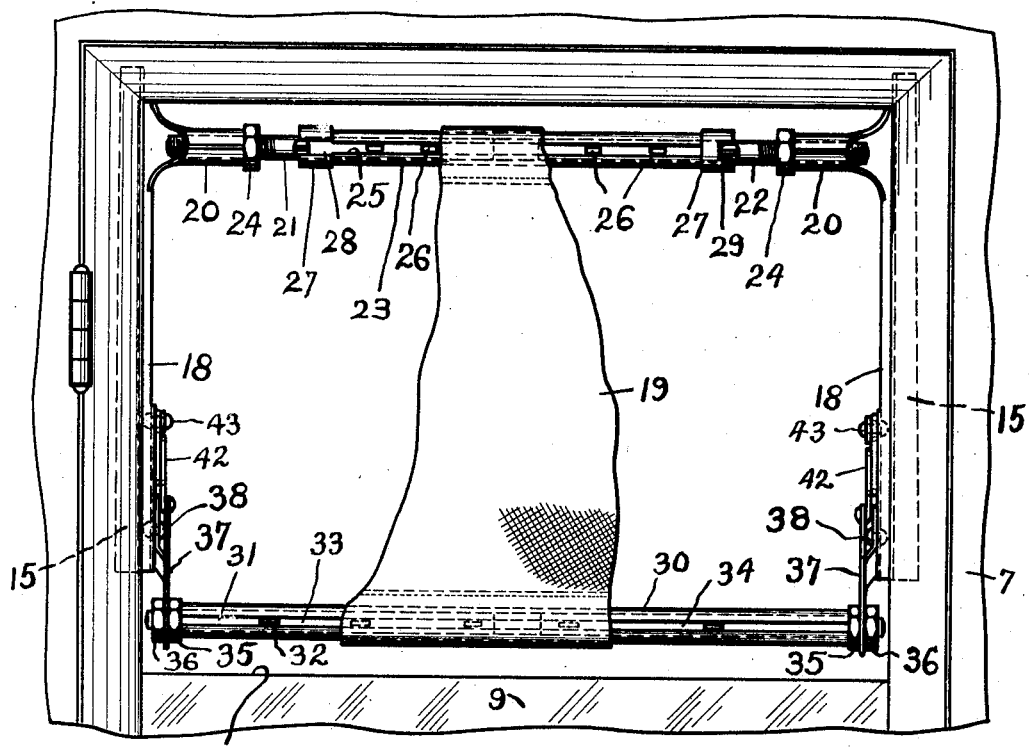
Fig. 1.
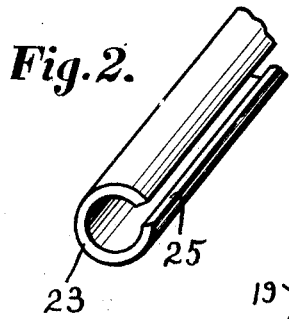
Fig. 2.
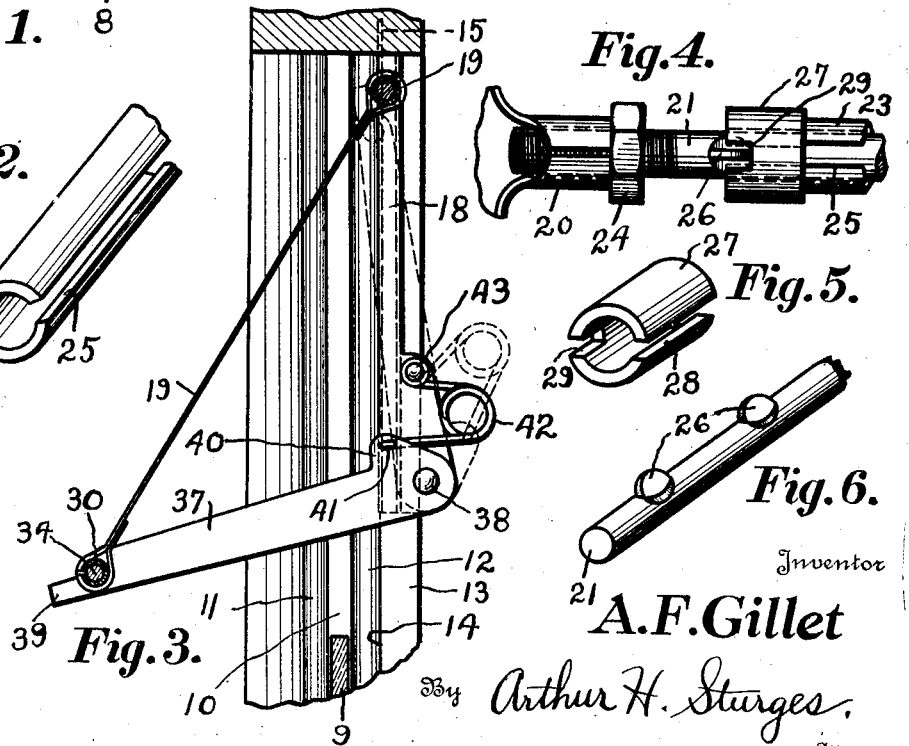
Inventor
A. F. Gillet
By Arthur H. Sturges,
Attorney Patented June 18, 1929.

1,717,921

UNITED STATES PATENT OFFICE.

ALEXIS F. GILLET, OF OMAHA, NEBRASKA, ASSIGNOR TO JUBILEE MANUFACTURING COMPANY, OF OMAHA, NEBRASKA, A CORPORATION OF NEBRASKA.

EXTENSIBLE FRAME FOR AUTOMOBILE AWNINGS.

Application filed February 13, 1928. Serial No. 254,008.

The present invention relates to improvements in extensible frames for automobile awnings, and has for an object to provide a frame construction which may be extended or contracted to fit within the several conventional sizes of the casings of automobile windows.

Another object of the invention is to provide a device of this kind which will obviate the necessity of dealers carrying in stock a large assortment of sizes of frames as was heretofore necessary.

A further object of the invention is to provide a simply constructed, compact and rigid, yet adjustable, awning frame construction, in which the range of adjustment will be a wide one, and in which the act of adjustment simple and capable of accomplishment in a minimum of time.

Other objects of the invention are generally to improve the construction, appearance and operation of automobile awnings and frames, to decrease the cost of production and render the distribution and application of the devices more simple.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary side elevation of an automobile showing the improved frame construction mounted in place therein with a portion of the fabric removed to expose the inner parts.

Figure 2 is a fragmentary perspective view of a portion of the adjusting device.

Figure 3 is a vertical section taken through the vehicle at right angles to Figure 1 and showing the improved awning mounted therein.

Figure 4 is an enlarged fragmentary detail view of the adjusting mechanism.

Figure 5 is a perspective view of the locking collar, and

Figure 6 is a similar view of one of the adjusting rods.

Referring more particularly to the drawings 7 designates an automobile or vehicle and 8 a window frame therein. As shown to better advantage in Figure 3, the window glass or sash is represented at 9 as movable, or adjustable, up and down in the window groove 10, which groove is provided, according to present automobile practice, between the felt strips 11 and 12. The window casing is indicated at 13. Between this window casing and the adjacent strip 12 will be found in common practice a gap 14, which is taken advantage of to receive the flanges 15 of the two side rails 18 which may fit up against the opposite side portions of the window casing 13. These flanges 15 may be simply slipped into the gaps 14.

The canvas or fabric of the awning is shown at 19 and it is looped about upper and lower supporting rods or sleeves as indicated.

The improved adjusting mechanism is situated at the upper portions of the rails 18, these rails being provided at their upper portions with tubular or hollow brackets 20 which extend mutually toward one another and into the window frame, although out of alinement with the vertically moved window pane or glass 9. The threaded ends of two axially adjustable rods 21 and 22 are received loosely and adjustably in the opposite brackets 20. The adjacent ends of the rods 21 and 22 fit loosely and slidably within the sleeve 23. Nuts 24 are threaded upon the threaded portions of the rods 21 and 22 and these nuts are large enough to abut against the inner end portions of the brackets 20.

The sleeve 23 is shown to advantage in Figure 2. The sleeve is divided by a lengthwise extending slot 25 of a width to receive slidably therein the lugs or projections 26 on the shafts 21 and 22. See in this connection Figure 6.

In Figures 4 and 5 is shown a locking collar 27 having a lengthwise extending slot 28 at one diametric side and a kerf or recess 29 opening through one end of the collar at the other diametric side. The kerf, however, may be located at any point around the sleeve. Two such collars 27 are mounted, one at each end of the sleeve 23 upon the rods 21 and 22 and the collars may be rotated independently of the sleeve 23 at desired times.

The lower portion of the awning fabric 19 is received about a sleeve or tube 30 having a longitudinally extending slot 31 for receiving the lugs or projections 32 which extend outwardly from a pair of rods 33 and 34 adjustably mounted within the sleeve 30. The end of each rod carries a pair of nuts 35 and 36 which are intended to be clamped upon opposite sides of the swinging awning arms 37 of which there are preferably two. Such awning arms are pivoted, as indicated at 38 to the lower portions of the side rails 18 and are adapted to swing up to the dotted line position, shown in Figure 3, in which case the ears 39 on the arms projecting beyond the sleeve 30 will encounter the brackets 20 to avoid further swinging movement.

The arms 37 are also provided near their pivot points with offset or bell crank portions 40. The bell crank portion of each arm is engaged fixedly by the end 41 of a spring member, which preferably has its intermediate portion 42 coiled into one or more convolutions. The other end of the spring is anchored fixedly to the respective rail 18, as indicated at 43.

Now in the use of the device, the awning may be folded as indicated in dotted lines in Figure 3, or may be pulled down to the full line position. In either case the springs 42 will hold the parts in position and against rattling, the spring action being applied to opposite sides of the pivot point 38 of the arms in the two positions mentioned.

Now in applying the frame, the collars 27 may be turned to the position shown in the left upper portion of Figure 1, where the slot 28 is in registry with the slot 25 of the sleeve 23. The lugs 26 may freely pass through both slots and, in this condition of the parts, both rods 21 and 22 may be adjusted axially in and out to get the requisite length of upper supporting member. This length may be roughly adjusted before applying the device to the window frame. The two rails 18 are first applied by inserting their flanges 15 in the opposite gaps 14. The collars 27 are then turned to the position just referred to, so that the rods may be adjusted in or out as required. After the adjustment, the collars are turned so that the kerfs or recesses 29 are in the path of the projections 26 and the rods are shifted inwardly so as to bring the projections into such kerfs or recesses, whereupon the rods will be locked against any further inward movement with respect to the sleeve 23 due to the fact that the collars 27 butt against the end portions of the sleeve 23 and are fixed against rotation since the lugs 26 are received within the recesses 29 of the collars and extend through the slot 25 of the sleeve 23. The locking condition of these parts is indicated in the upper right hand portion of Figure 1. The final adjustment is made by running the nuts 24 outwardly upon the threaded end-portions of the rods, after these ends have been inserted through the tubular brackets 20. The nuts are run against the brackets as shown in Figure 1. The engagement of the nuts against the bracket ends and the projection 26 against the inner end-portions of the kerfs or recesses in the collars 27 will hold the parts tightly and against objectionable rattling and the device will be snugly secured to the window frame.

The lower rods 33 and 34 may be pulled out and in in accordance with the horizontal length of the window opening.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. In an extensible frame for vehicle awnings, brackets, rods having outer threaded ends fitted to said brackets and having projections thereon, a sleeve adapted to receive the inner ends of the rods, nuts on the rods to take against said brackets, and collars rotatably mounted on said sleeve and having recesses therein to receive the projections on said rods.

2. In an extensible frame for automobile awnings, opposed brackets adapted to engage the inner opposite jambs of a window, alined rods having ends slidably fitting in the brackets and having external threads, nuts on said threaded ends of the rods for engagement against the brackets to hold the same against said window jambs, each rod having longitudinally spaced apart projections on its inner end, a sleeve slidably receiving the inner ends of the rods and having a longitudinal slot to accommodate the projections, and collars mounted for rotation about the rods at the outer ends of the sleeve and each having a through slot in one side for the passage of said projections therethrough and each having in another side a recess at its outer end for receiving and holding an adjacent projection to maintain the rods in extended position.

In testimony whereof I have affixed my signature.

ALEXIS F. GILLET.